(12) United States Patent
Li et al.

(10) Patent No.: US 7,689,538 B2
(45) Date of Patent: Mar. 30, 2010

(54) AUTONOMIC RECOMMENDATION AND PLACEMENT OF MATERIALIZED QUERY TABLES FOR LOAD DISTRIBUTION

(75) Inventors: Wen-Syan Li, Fremont, CA (US); Daniele C. Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 11/340,203

(22) Filed: Jan. 26, 2006

(65) Prior Publication Data

US 2007/0174292 A1    Jul. 26, 2007

(51) Int. Cl.
*G06F 7/00*    (2006.01)
*G06F 17/30*   (2006.01)

(52) U.S. Cl. .................................. 707/2; 707/1; 707/3
(58) Field of Classification Search ............... 707/4, 707/10, 5

See application file for complete search history.

(56) References Cited

U.S. PATENT DOCUMENTS

| | | | | |
|---|---|---|---|---|
| 4,769,772 | A * | 9/1988 | Dwyer | 707/2 |
| 5,301,317 | A * | 4/1994 | Lohman et al. | 707/2 |
| 5,412,806 | A | 5/1995 | Du et al. | |
| 5,870,759 | A * | 2/1999 | Bauer et al. | 707/201 |
| 5,943,666 | A | 8/1999 | Kleewein et al. | |
| 5,950,186 | A * | 9/1999 | Chaudhuri et al. | 707/2 |
| 6,026,390 | A * | 2/2000 | Ross et al. | 707/2 |
| 6,026,391 | A * | 2/2000 | Osborn et al. | 707/2 |
| 6,061,741 | A * | 5/2000 | Murphy et al. | 709/248 |
| 6,125,360 | A * | 9/2000 | Witkowski et al. | 707/2 |
| 6,223,171 | B1 * | 4/2001 | Chaudhuri et al. | 707/2 |
| 6,233,584 | B1 * | 5/2001 | Purcell | 707/103 X |
| 6,275,818 | B1 * | 8/2001 | Subramanian et al. | 707/2 |
| 6,334,128 | B1 * | 12/2001 | Norcott et al. | 707/5 |
| 6,356,889 | B1 * | 3/2002 | Lohman et al. | 707/2 |
| 6,356,890 | B1 * | 3/2002 | Agrawal et al. | 707/2 |

(Continued)

OTHER PUBLICATIONS

Chan et al, "Design and Selection of Materialized Views in a Data Warehousing Environment: A Case Study", Proceedings of the 2nd ACM International Workshop on Data Warehousing and OLAP (DOLAP '99), Nov. 1999, pp. 42-47.*

(Continued)

*Primary Examiner*—James Trujillo
*Assistant Examiner*—Marc Somers
(74) *Attorney, Agent, or Firm*—Gibb I.P. Law Firm, LLC

(57) ABSTRACT

A system and method of evaluating queries in distributed databases with MQTs comprises deriving MQTs; replicating the derived MQTs from a local server to at least one remote server; and distributing data and replicated derived MQTs to a plurality of other remote servers, wherein the distributing increases overall query execution efficiency. The databases may comprise heterogeneous databases. The query execution efficiency comprises observed response time at a frontend database and associated costs comprising computational central processing unit costs, input/output costs, and network communication costs. All of the associated costs comprise statistically estimated costs. The method further comprises running a MQT advisor at a frontend database, and considering the costs of at least one MQT placed at the frontend database. The method further comprises running a MQT advisor at a non-frontend database. Additionally, the increased overall query execution efficiency may consider all dependencies of all involved database instances and associated costs.

21 Claims, 10 Drawing Sheets

U.S. PATENT DOCUMENTS

| | | | |
|---|---|---|---|
| 6,496,828 B1 * | 12/2002 | Cochrane et al. | 707/10 |
| 6,513,029 B1 | 1/2003 | Agrawal et al. | |
| 6,708,179 B1 | 3/2004 | Arora | |
| 6,763,352 B2 | 7/2004 | Cochrane et al. | |
| 6,882,993 B1 | 4/2005 | Lawande et al. | |
| 6,889,333 B2 * | 5/2005 | Lawrence et al. | 713/400 |
| 7,308,437 B2 * | 12/2007 | Day et al. | 707/2 |
| 7,313,603 B2 * | 12/2007 | Lee et al. | 709/219 |
| 2001/0056435 A1 * | 12/2001 | Quick | 707/104.1 |
| 2002/0184530 A1 * | 12/2002 | Spector | 713/201 |
| 2003/0088541 A1 * | 5/2003 | Zilio et al. | 707/1 |
| 2005/0010558 A1 * | 1/2005 | Dettinger et al. | 707/3 |
| 2005/0065921 A1 | 3/2005 | Hrle et al. | |
| 2005/0234945 A1 * | 10/2005 | Folkert et al. | 707/100 |
| 2005/0234971 A1 * | 10/2005 | Folkert et al. | 707/102 |

OTHER PUBLICATIONS

Li et al, "Load Balancing for Multi-tiered Database Systems through Autonomic Placement of Materialized Views", Proceedings of the 22nd International Conference on Data Engineering (ICDE '06), Apr. 3-7, 2006, pp. 102-113.*

Eisenberg, et al., "SQL:2003 Has Been Published," SIGMOD Record, vol. 33, No. 1, Mar. 2004, pp. 119-126.

Amer-Yahia, et al., "A Declarative Approach to Optimize Bulk Loading Into Databases," ACM Transactions on Database Systems, vol. 29, No. 2, Jun. 2004, pp. 233-281.

Subramanian, et al., "Cost-Based Optimization of Decision Support Queries Using Transient-Views," SIGMOD '98, ACM 1998, pp. 319-330.

Goetz Graefe, "Query Evaluation Techniques for Large Databases," ACM Computing Surveys, vol. 25, No. 2, Jun. 1993, pp. 73-170.

Gryz, et al., "Query Sampling in DB2 Universal Database," SIGMOD 2004 Jun. 13-18, 2004, ACM, 2004, 5 pages.

* cited by examiner

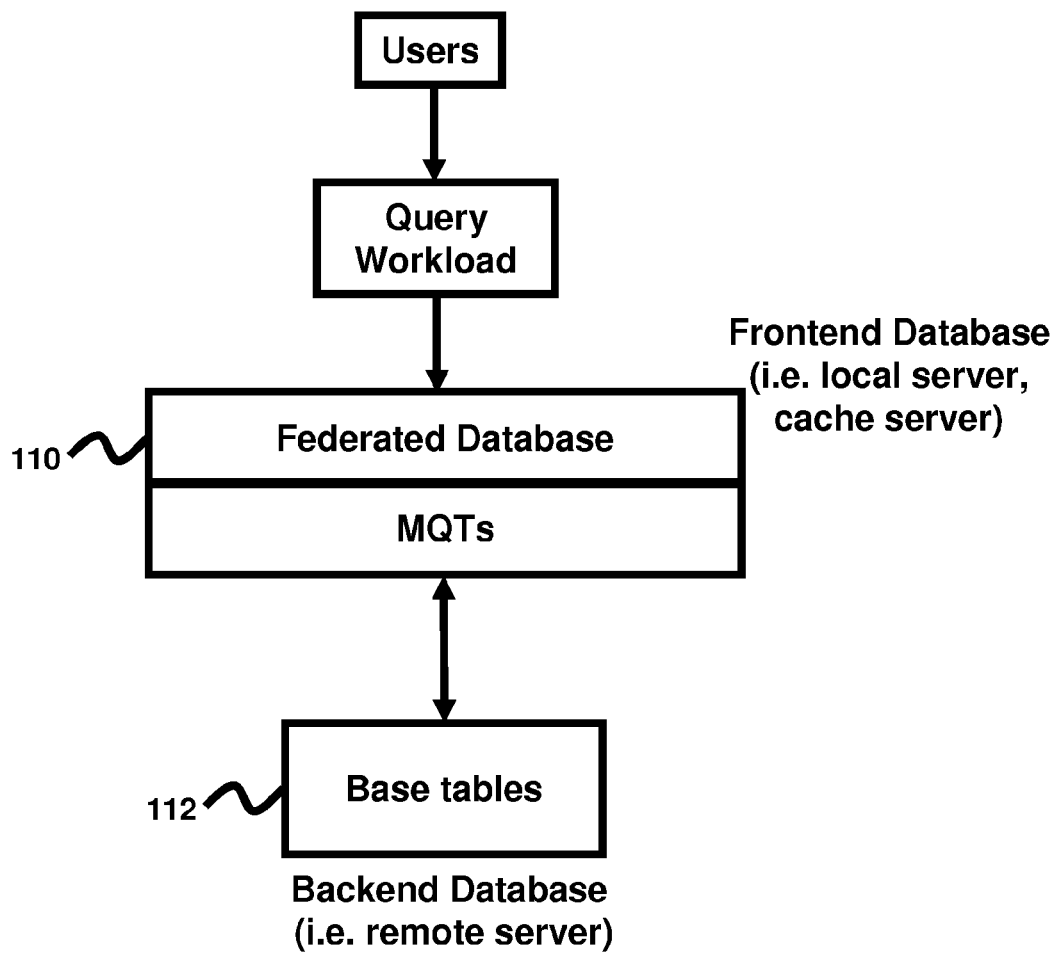

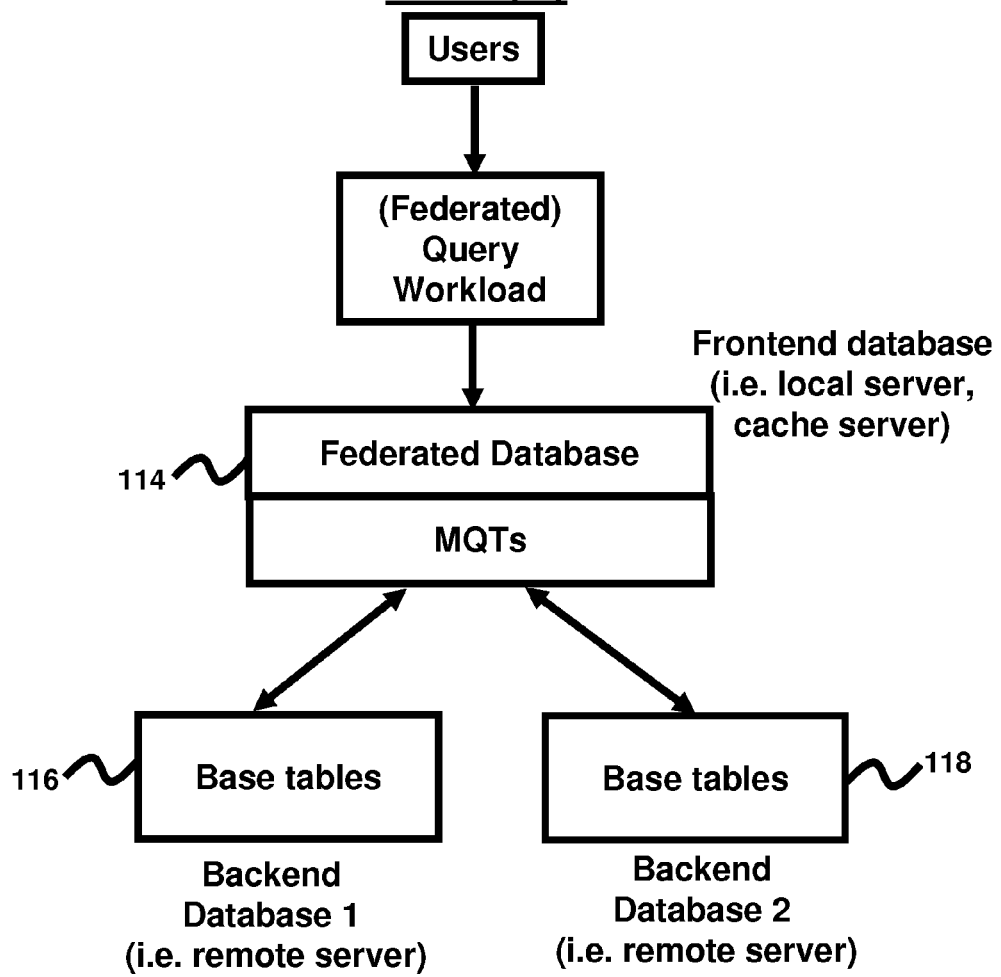

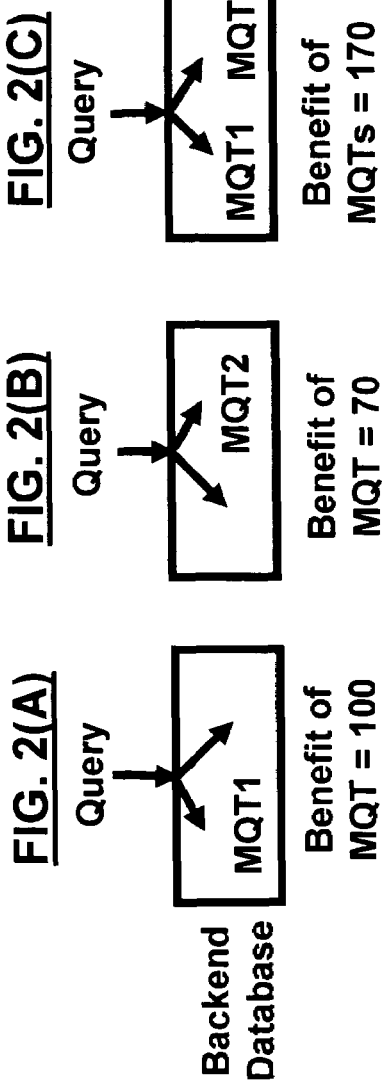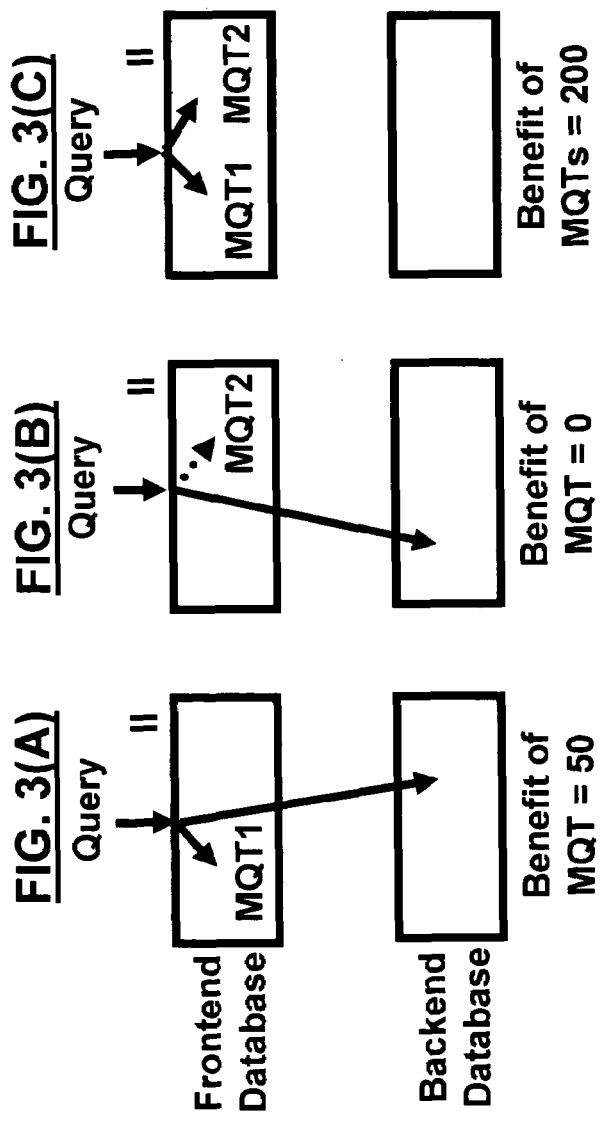

AUTONOMIC RECOMMENDATION AND PLACEMENT OF MATERIALIZED QUERY TABLES FOR LOAD DISTRIBUTION

BACKGROUND

1. Technical Field

The embodiments herein generally relate to computer database systems, and, more particularly, to query processes performed on computerized databases.

2. Description of the Related Art

Generally, in the realm of computer database systems a materialized query table (MQT) is a table that is defined by a query that is also used to determine the data in the table. Materialized query tables can be used to improve the performance of queries run on databases. In a partitioned database environment, one may replicate materialized query tables. One may also use replicated materialized query tables to improve query performance. The Materialized Query Table Advisor (MQTA) is generally used to recommend and create materialized query tables (MQTs) for a standalone database in order to improve response times of queries. In this configuration, MQTs are generally placed on the same server on which the base tables are located. Generally, MQTs are created to reduce the query processing cost by replacing parts of the query with existing and matched MQTs. However, the MQTA does not generally apply to a distributed environment where MQTs need to be recommended and placed on one or more remote servers to offload the traffic to the backend (i.e., remote) database. The frontend (i.e., local) database typically deploys a federated database. The federated database is able to utilize the matched MQTs at the frontend database, rewrite the query, forward the rewritten query to the backend database, and merge the results from the backend database and the MQTs.

FIG. 1(A) shows the operational flow of a MQTA. The process takes (101) a workload (i.e., read and write queries to the database system) and simulated catalog (i.e., database statistics and system catalog) as the input. The process first performs a workload compression to remove those insignificant queries, which are inexpensive or infrequent. The process then performs (103) multi-query optimization to derive common parts in the workload and generates candidate MQTs. In the next step, (105), the MQTA (1) calculates the benefits of these candidate MQTs (in terms of resource time reduction based on simulated catalog); (2) calculates overhead (in terms of resource time) for refreshing MQTs by incorporating database updates; (3) estimates the size of MQTs; (4) calculates the utility of each MQT by dividing net benefit (i.e., benefit minus overhead) by the size of the MQT and its indices size; and (5) recommends in step (107) the MQTs whose utility values are higher than a given threshold.

In the system configurations described herein, the frontend database may be embodied, for example, as a WebSphere™ II (formerly called DB2 II) database, available from International Business Machines (IBM), NY, USA, which is a local server where federated queries are submitted for processing and where the backend database includes remote servers that can be any database management system. Although the WebSphere™ II database is used herein as an example, those skilled in the art would readily acknowledge that other comparable databases could be used in the context of the embodiments herein. In a typical deployment, the frontend database is closer to the users or applications than the backend databases. Thus, the frontend database is established as a cache server to store MQTs to answer the whole or part of federated queries submitted to the frontend database (i.e., local server and cache server). Hereinafter, the terms local server, frontend, frontend database, and cache server are used interchangeably. Moreover, the terms remote server, backend, and backend database are used interchangeably.

The frontend database typically deploys a federated database, such as IBM's WebSphere™ Information Integrator (II). The federated database is able to utilize the matched MQTs at the frontend database, rewrite the query, forward the rewritten query to the backend database, and merge the results from the backend database and the MQTs. In FIG. 1(B), a system configuration is shown in which a frontend database 110 (for example, WebSphere™ II) is used as a cache server for a single backend database 112. In FIG. 1(C), a more complex system configuration is shown having one frontend database 114 and two backend databases 116, 118. In this configuration, the frontend database (for example, WebSphere ™ II) is used as both a cache server and a federated database 114 for two backend databases 116, 118. The workload to the system could be federated queries that involve multiple databases.

To summarize, the frontend database is used for the following purposes: caching MQTs; providing query optimization by evaluating if MQTs can be used to improve query response time; rewriting queries if cached MQTs can only answer part of the query; rewriting federated queries using nicknames to queries using table names in the remote servers; merging query results from the remote servers and cached MQTs (if MQTs are used); and a simulated environment used by a MQTA and a Data Placement Advisor (DPA). In this context, data placement may refer to caching and replication of data.

One generally straightforward way to apply a MQTA for the distributed environment is to run the MQTA at the backend database and replicate MQTs recommended by the MQTA to the frontend database or databases. However, this approach does not generally consider the MQT dependency in a distributed environment. FIGS. 2(A) through 2(C) illustrate the MQT dependency in a standalone database. The MQTA calculates the benefits of MQT1 and MQT2 as 100 and 70, respectively, when they are presented separately. These benefits are calculated by compiling the related query in the workload twice with and without the MQT presented. One only has to compile these queries which have structural matches with the MQTs.

When both MQT1 and MQT2 are presented, the benefit is 170, the summation of the benefits by MQT1 and MQT2. In the standalone database environment, the benefits of MQTs are independent to each other. However, this dependency does not hold true in the distributed environment where a frontend database is deployed close to users and/or applications for offloading traffic to the backend database.

FIGS. 3(A) through 3(C) demonstrate that the benefit of MQT1 and MQT2 calculated in the backend database by MQTA are dependent when they are placed at the frontend database. In the example shown in FIG. 3(A), when MQT1 is placed at the frontend database, part of the query needs to be sent to the backend database. As a result, the benefit of MQT1 is less than 100. Similarly, it is shown in FIG. 3(B) that MQT2 yields a benefit of 70 when it is placed on the backend database. However, a federated database optimizer may not use it even though there is a MQT match with the same query when MQT2 is placed at the frontend database. The reason could be that using MQT2 may result in a big block of intermediate results returned from the backend database to the frontend database. Typically, an II optimizer estimates using MQT2 will make query processing more expensive than not using MQT2. As a result, MQT2 generally yields no benefit when it is placed at the frontend database. In FIG. 3(C), both MQT1 and MQT2 are presented to the query optimizer; the II will utilize both MQTs and yield a benefit of 200 (i.e., greater than 170) since utilizing MQTs in this case yields reduction in both processing latency and network latency.

To summarize, current MQTAs are designed to recommend and create MQTs on the same database server where the base tables are located. By creating appropriate MQTs, a MQTA reduces the computation latency; however, it does not typically reduce network latency nor support load distribution since all query processing tasks are still performed at the database management system (DBMS). Accordingly, there remains a need for a new approach to utilize a MQTA in order to improve query processes in computer database systems.

SUMMARY

In view of the foregoing, an embodiment provides a method of evaluating queries in distributed databases with materialized query tables (MQTs), and a program storage device readable by computer, tangibly embodying a program of instructions executable by the computer to perform the method of evaluating queries in distributed databases with MQTs, wherein the method comprises deriving MQTS; replicating the derived MQTs from a local server to at least one remote server; and distributing data and replicated derived MQTs to a plurality of other remote servers, wherein the distributing increases overall query execution efficiency. The databases may comprise heterogeneous databases. Preferably, the query execution efficiency comprises observed response time at a frontend database and associated costs comprising computational central processing unit costs, input/output costs, and network communication costs. Preferably, all of the associated costs comprise statistically estimated costs. The method may further comprise running a MQT advisor at a frontend database, and considering the costs of at least one MQT placed at the frontend database. Moreover, the method may further comprise running a MQT advisor at a non-frontend database. Additionally, the increased overall query execution efficiency may consider all dependencies of all involved database instances and associated costs. Furthermore, the deriving of the MQTs preferably occurs using a data placement advisor database management system.

Another embodiment provides a system of evaluating queries in distributed databases with materialized query tables (MQTs), wherein the system comprises MQTS; a replicator adapted to replicate the derived MQTs from a local server to at least one remote server; and an information integrator adapted to distribute data and replicated derived MQTs to a plurality of other remote servers, wherein the distributing increases overall query execution efficiency. The databases may comprise heterogeneous databases. Preferably, the query execution efficiency comprises observed response time at a frontend database and associated costs comprising computational central processing unit costs, input/output costs, and network communication costs. Preferably, all of the associated costs comprise statistically estimated costs. The system may further comprise means for running a MQT advisor at a frontend database, and considering the costs of at least one MQT placed at the frontend database. Also, the system may further comprise means for running a MQT advisor at a non-frontend database. Furthermore, the increased overall query execution efficiency may consider all dependencies of all involved database instances and associated costs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1(B) illustrates a block diagram of a distributed environment with one frontend database and one backend database;

FIG. 1(C) illustrates a block diagram of a distributed environment with one frontend database and two backend databases;

FIGS. 2(A) through 2(C) illustrate diagrams of MQT dependency in a standalone database;

FIGS. 3(A) through 3(C) illustrate diagrams of MQT dependency in a multiple database configuration;

DETAILED DESCRIPTION OF PREFERRED EMBODIMENTS

Figure 1A:
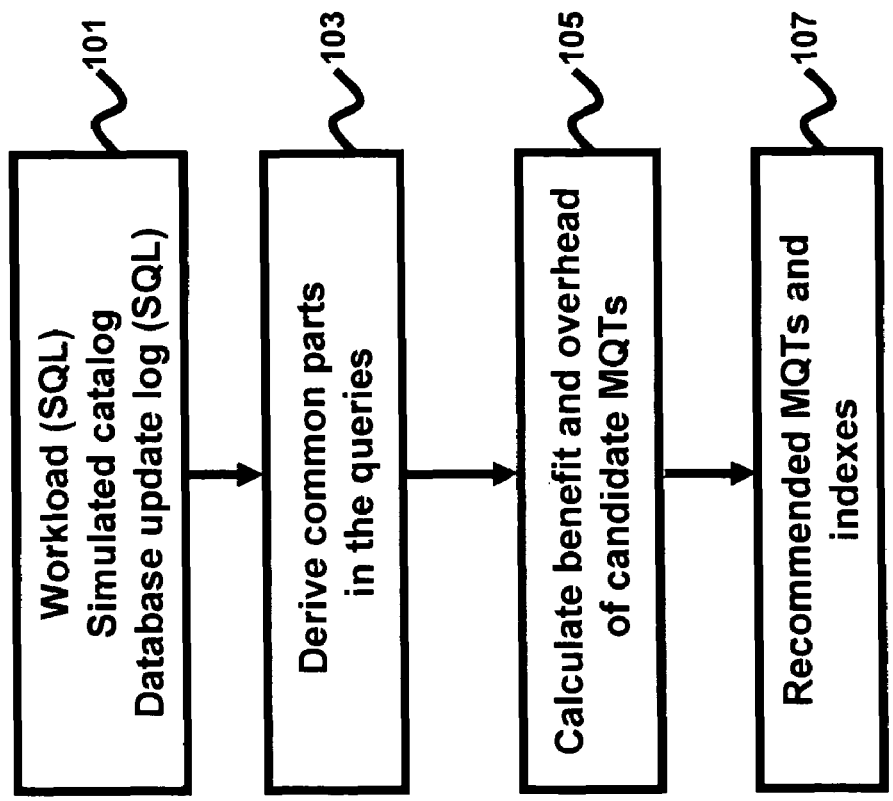
FIG. 1(A) illustrates a block diagram of a MQT advisor operational process flow sequence.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new approach to utilize a MQTA in order to improve query processes in computer database systems. The embodiments herein achieve this by extending the MQTA functionality by deriving MQT dependency and applying the MQTA to distributed environments. The DPA takes the analytic results from the MQTA and performs additional frontend MQT synchronization cost analysis and what-if data placement (i.e., caching and replication) so that traffic can be offloaded from the backend databases for better overall response time. Referring now to the drawings, where similar reference characters denote corresponding features consistently throughout the figures, there are shown preferred embodiments.

By building on top of the MQTA, the embodiments herein provide a novel DPA that derives MQTs and replicates them to one or more remote servers for load distribution by offloading workload from the backend database to other remote servers; and reduces network latency by placing MQTs and base tables (i.e., replicas) close to users and applications.

The embodiments herein consider the network latency and bandwidth, CPU ratio, and input/output (I/O) ratio between the frontend database and the backend database to recommend MQTs. The DPA takes a user specified preference of disk space allocated at the frontend database for caching MQTs and MQTA recommended MQTs with consideration of MQT dependency as depicted in FIGS. 3(A) through 3(C) and a goal of minimizing observed response time at the frontend databases (in terms of resource time required for query processing measured at the frontend database).

Figure 4:
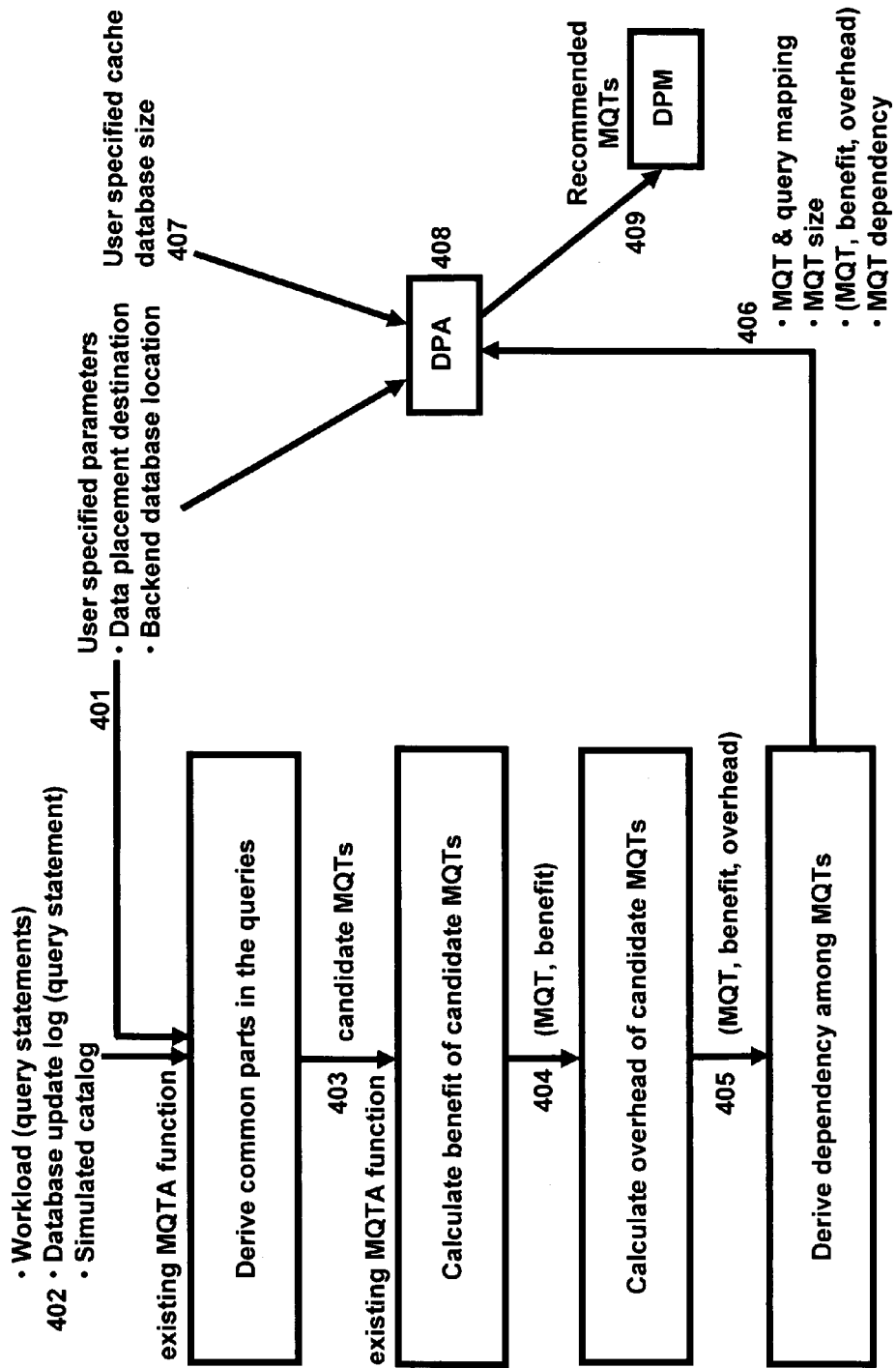
FIG. 4 illustrates an operational flow diagram for a DPA in a frontend database according to an embodiment herein.

The operational flow of the DPA provided by the embodiments herein is described below. First, as illustrated in FIG. 4, in step (401), the user provides a MQTA with related parameters including data placement destination (i.e., frontend database), and backend database location. Next, in step (402), the workload to the system available at the frontend database, database update log (i.e., query statements), and simulated catalog of the backend database are loaded into MTQA based on the user's specification in step (401). The database update log and read workload are packed into a single workload.

Next, in step (403), MQTA performs workload compress and multi-query optimization to derive a common part of query statements. A candidate MQTs and their indices are derived. Thereafter, in step (404), the MQTA then calculates the benefit of each MQT for the read queries in the whole workload. The benefit for each MQT is measured in terms of resource time at the frontend database. The output is in the form of (read query, MQT, total benefit) for each query instance. In this context, an instance is a logical database manager environment where one may catalog databases and set configuration parameters. Moreover, multiple instances may be created on the same physical server providing a unique database server environment for each instance. Total benefit is calculated if a query instance occurs multiple times in the workload. The MQTA derives the benefit of a MQT by compiling the query twice in the explain mode with the MQT turned on and off. The MQTA then calculates the benefit of the MQT by comparing the estimated query processing time with and without the MQT.

In step (405), the MQTA calculates the overhead of refreshing each MQT for the write queries in database update log. The overhead for refreshing each MQT is measured in terms of resource time at the frontend database and is measured for the update log for the whole workload. The output is in the form of (MQT, total overhead). In step (406), the MQTA derives dependency of MQTs (i.e., co-usage by a single query) and their benefits. The MQTA outputs the following files to the DPA: MQT and its ID, indexes, size, associated base tables, (ID: sequence number from 1 to N; MQT: MQT itself in the form of a structured query language (SQL) statement; Index for MQT in the form of a SQL statement; Size: size of MQT and index; Associated base table or tables: table names at the backend database); MQT and query mapping in the form of (MQT, queries); and MQT dependency: this information indicates how MQTs are co-used in a single query. The format is (Query, MQT ID or IDs, additional base table or tables required to answer the query, total benefit). For example if a query Q1 involves operations on tables TI, T2, and T3. The query matches with MQT1 and MQT2 are based on the base tables T1 and T2 respectively. The MQT dependency for Q1 could be as follows: (Q1, MQT1, T2, T3, 100) where 100 is the benefit of MQT1 if no other MQT is presented; (Q1, MQT2, T1, T3, 70) where 70 is the benefit of MQT1 if no other MQT is presented; and (Q1, MQT1, MQT2, T3, 200) where 200 is the benefit of MQT1 and MQT2.

Next, in step (407), the user provides the DPA with cache database sizes allocated for MQTs and table replicas at the frontend database and the backend databases. The user can specify: total space limit for all servers; space limit for the frontend database; and/or space limit for the backend database.

Thereafter, in step (408), the DPA takes the output from the MQTA and user specified parameters and then performs the following tasks: synchronization cost analysis and what-if analysis. In the synchronization cost analysis, for each MQT, an estimate is made of the synchronization costs for the frontend database and the backend database. The synchronization cost estimation depends on the synchronization method deployed. For example, if a MQT is created at the backend database first and replicated to the frontend database via replication utility software, the total cost for synchronizing the MQT at the frontend database is the cost of reading MQT update logs in the backend database plus the cost of updating the MQT at the frontend database. The total synchronization cost is estimated at the frontend databases by executing read, update, and insert queries in the explain mode. The synchronization cost is measured in terms of resource time with respect to the frontend database and used by the DPA for what-if analysis.

What-if analysis for data placement includes the following steps: (1) Create a rank list for MQTs sorted by ROI (Return On Investment). The return is the net benefit of a MQT (i.e. total benefit—total overhead—total synchronization cost) for a MQT for the workload and the investment is the size of MQT and its index. ROI is calculated by dividing net benefit of a MQT by its size. For each MQT, a calculation is made of its ROI and it is inserted into the rank list. (2) For each MQT co-usage case (derived using MQT dependency), a virtual caching unit (VCU) is created. (3) For each VCU, a calculation is made of its ROI and it is inserted into the rank list. For example, if MQT1 and MQT2 are co-used by a set of queries, the VCU for the co-usage case (MQT1, MQT2) is the summation of the total benefit of MQT1 used alone, total benefit of MQT2 used alone, and total benefit of MQT1 and MQT2 used together divided by the total size of MQT1 and MQT2.

(4) The MQT or VCU is selected from the rank list that has the highest ROI and fits the space limitation constraint. The selected MQT or VCU is removed from the rank list and it is inserted into the recommended MQT list in which its elements are ranked by their ROI values. (5) ROIs for all MQTs and VCUs are recalculated by considering the possible impact of selected MQT/VCU to MQT co-usage benefits or space requirement for VCUs. For example, if MQT1 is selected to insert into the rank list, the MQT2 is removed from the rank list since it is subsumed by the VCU for MQT1 and MQT2. The ROI of VCU with MQT1 and MQT2 is revised as a summation of the total benefit of MQT2 used alone, and the total benefit of MQT1 and MQT2 used together divided by the size of MQT2. If later, both MQT1 and MQT2 are inserted into the recommended MQT list, the DPA removes the entries (MQT1) and (MQT2) and replaces them with a single entry (MQT1, MQT2) since MQT1 and MQT2 are placed to the frontend database at the same time. (6) The process moves to step (4) until no MQT or VCU can be selected.

In step (409), the DPA outputs the recommended MQT list to Data Placement manager (DPM), a component that is responsible for setting up MQTs. The DPM sets up MQTs in the following steps: (1) Create MQTs at the backend database; (2) Create MQTs at the frontend database based on the MQTs at the backend and setup synchronization via replication utility such as Q replication or SQL replication tools; and (3) If remote MQT functions are supported at the frontend database and the backend database, the MQTs at the backend database do not have to be created.

After MQTs are created at the frontend database, the query workload to the backend database will change since some queries will be rewritten to utilize MQTs cached at the frontend database. As a result, the existing MQTs at the backend database may not be as effective as before since the query workload is different now. Optionally, the user can rerun the MQTA to adjust the previously designed MQTs. The MQTs created at the backend for synchronizing the MQTs at the frontend database cannot be removed after MQTA is executed at the backend.

In this system architecture, whether or not to utilize MQTs cached at the frontend database and query rewriting (if a MQT is utilized in the query processing) are performed by the federated database query optimizer at the frontend database. Furthermore, the query routing between the frontend database and the backend database is handled by the DB2 II via nickname definitions.

Figure 5:
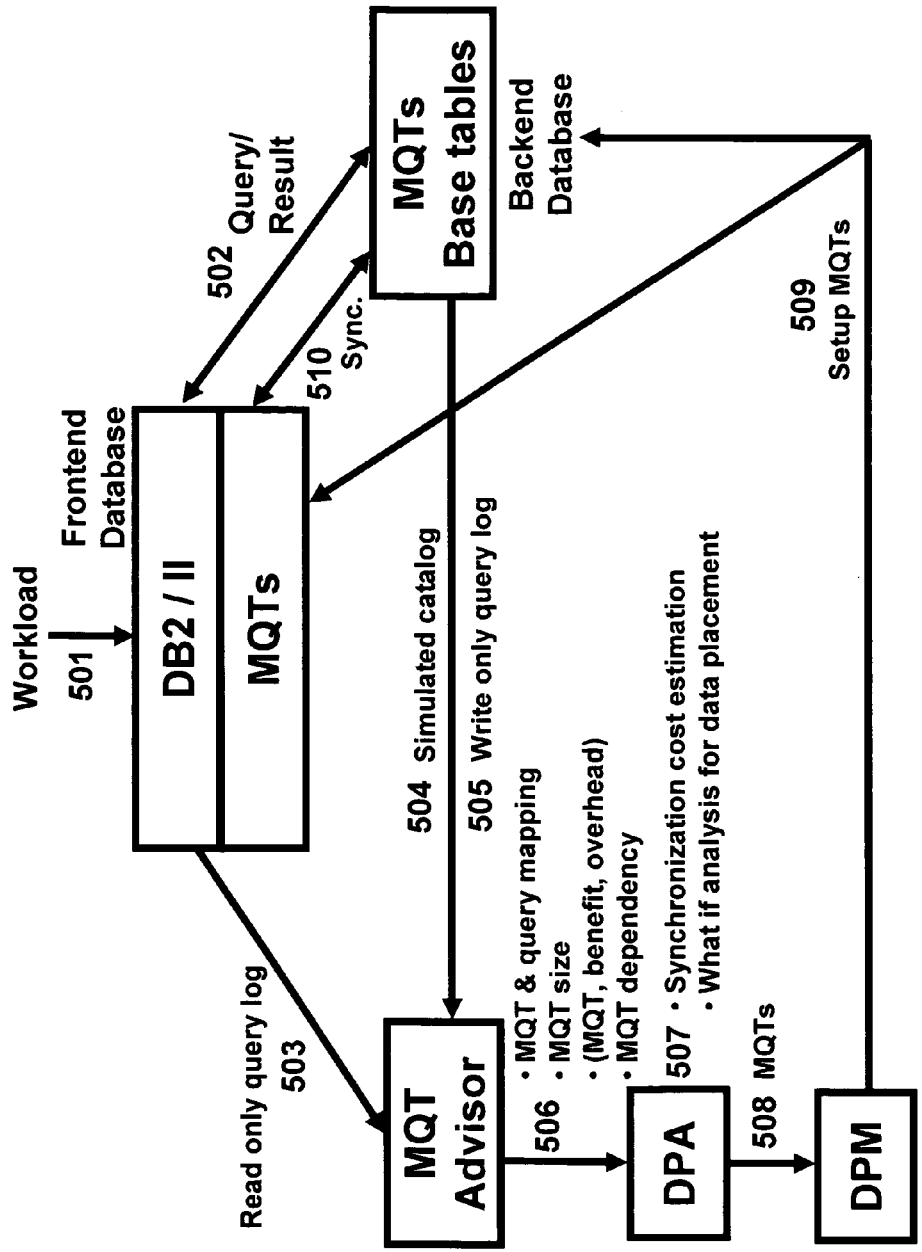
FIG. 5 illustrates a system architecture diagram illustrating the deployment of MQTA and DPA for a frontend database according to an embodiment herein.
Figure 6:
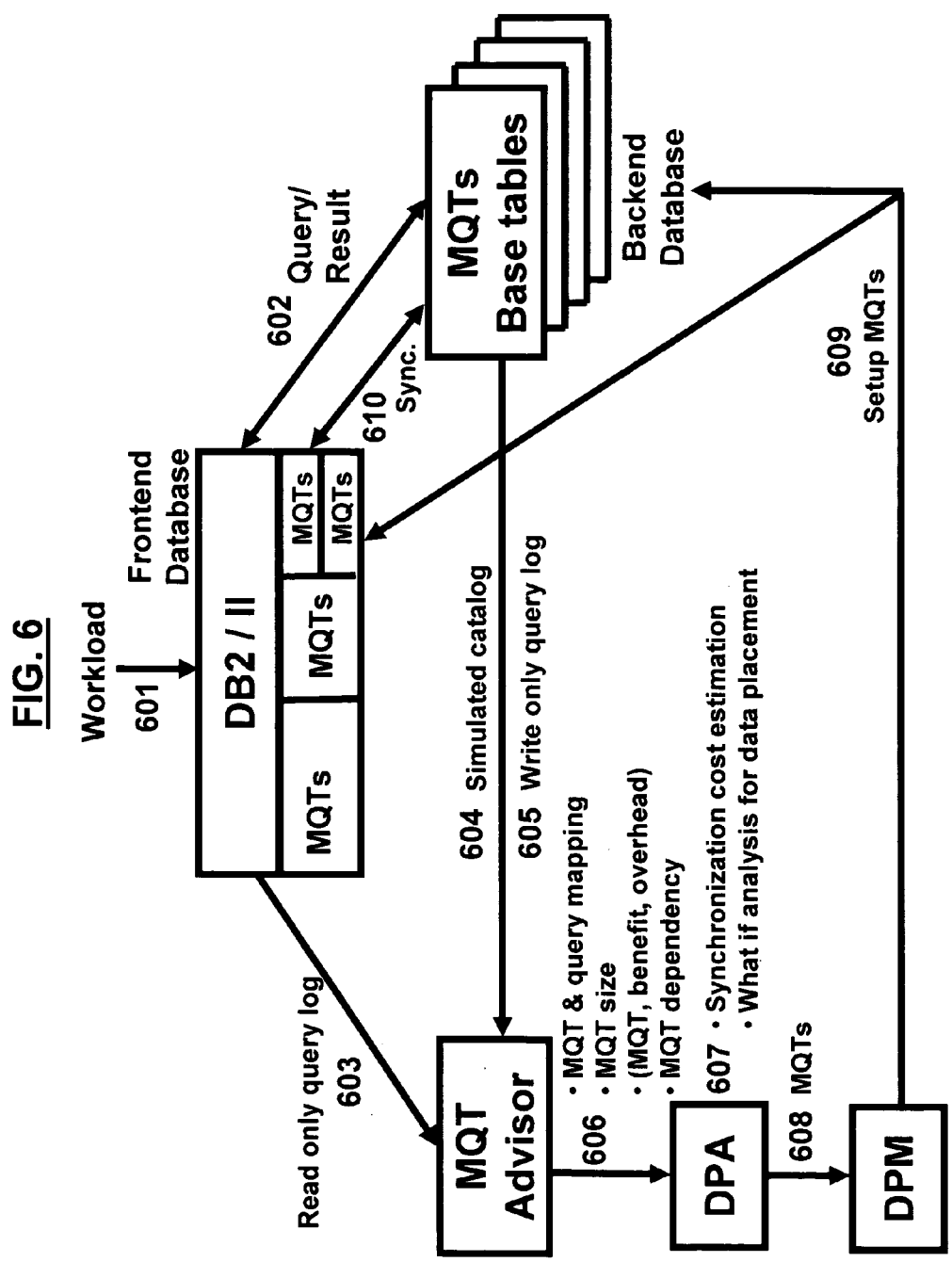
FIG. 6 illustrates a system architecture diagram illustrating a single frontend database with multiple backend databases according to an embodiment herein.
Figure 7:
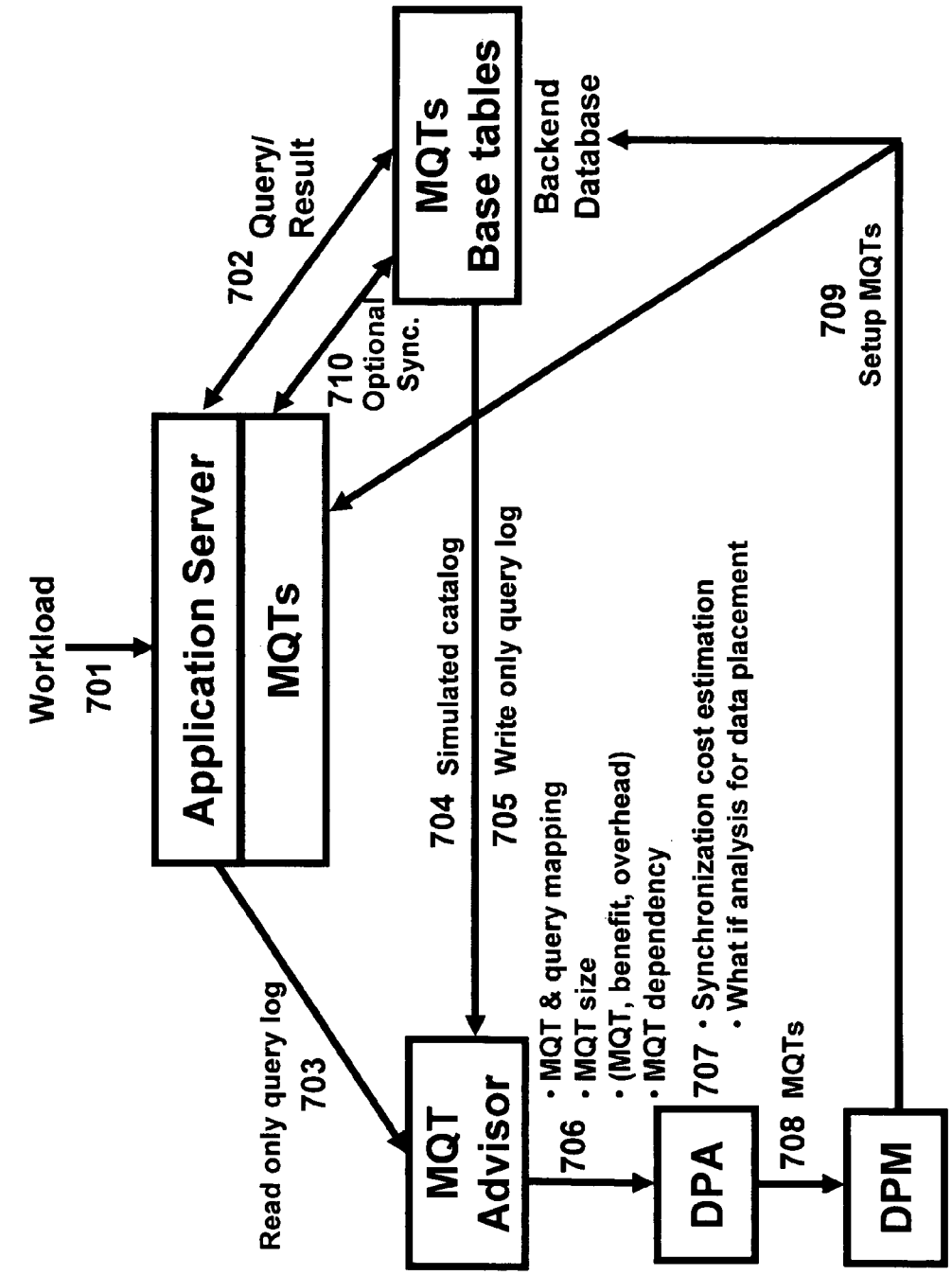
FIG. 7 illustrates a system architecture diagram illustrating the deployment of MQTA and DPA for data cache at application servers according to an embodiment herein.

The DPA provided by the embodiments herein are exemplified in three preferred system configurations for deployment depicted in FIGS. 5 through 7. In the first configuration, the system architecture includes of a frontend database and a backend database. Only MQTs are replicated to the frontend database. This system architecture is illustrated in FIG. 5 and the underlined numbers indicate the sequence of the interaction between components. In this system architecture, the MQTA is deployed at the data placement destination. Alternatively, the MQTA can be deployed at a separate server while the related parameters including CPU ratio, I/O ratio, and network bandwidth used to configure the information integrator as well as database statistics (i.e., simulated catalog) are copied to the server. The second system architecture includes of a frontend database and multiple backend databases. Only MQTs are replicated to the frontend database. The system architecture for the second system is illustrated in FIG. 6. The third system architecture, shown in FIG. 7, includes a backend database and an application server. A middleware is deployed at the application server to provide data caching function.

FIG. 5 illustrates the interactions between components. The query workload is submitted to the DB2/II in step (501). Then, the queries are recorded in the log. The queries may be answered using MQTs or partially answered using MQTs and some queries (or queries fragments, which cannot be answered using MQTs) are forwarded to the backend database (502). The results are returned to the DB2/II and then returned to the user(s). Next, a read only query log (503) and write only query log (505) are loaded into MQTA along with simulated catalog (i.e., database statistics) (504). The MQTA then generates (506) MQT & query mapping, MQT size, (MQT, benefit, overhead), and MQT dependency. The DPA, then performs (507) additional tasks such as: synchronization cost estimation and what if analysis for data placement. Then, the DPA outputs (508) MQTs to the DPM. The MQTs generated by the DPA can be different from the MQTA recommended. Next, the DPM sets up MQTs at the II and sets up MQT synchronization in step (509). To support full refresh of MQTs at II, the DPM does not set up MQTs at the backend database. However, if the DPM wants to sets up incremental refresh (i.e., synchronization (510)), the DPM may need to set up MQTs at the backend database for the purpose of MQT maintenance.

In FIG. 6, a system configuration is shown comprising a single frontend database used to cache MQTs and shared by multiple backend databases. The sequence shown in FIG. 6 is the same as described in FIG. 5, except the II disk space is shared by various backend databases. Thus, although MQTs are recommended by the DPA for each backend database, the DPA/DPM compares the ROI of all MQTs and places those with a higher ROI to the DB2/II.

Hence, the query workload is submitted to the DB2/II in step (601). Then, the queries are recorded in the log. The queries may be answered using MQTs or partially answered using MQTs and some queries (or queries fragments, which cannot be answered using MQTs) are forwarded to the backend database (602). The results are returned to the DB2/II and then returned to the user(s). Next, a read only query log (603) and write only query log (605) are loaded into MQTA along with simulated catalog (i.e., database statistics) (604). The MQTA then generates (606) MQT & query mapping, MQT size, (MQT, benefit, overhead), and MQT dependency. The DPA, then performs (607) additional tasks such as: synchronization cost estimation and what if analysis for data placement. Then, the DPA outputs (608) MQTs to the DPM. The MQTs generated by the DPA can be different from the MQTA recommended. Next, the DPM sets up MQTs at the II and sets up MQT synchronization in step (609). To support full refresh of MQTs at II, the DPM does not set up MQTs at the backend database. However, if the DPM wants to sets up incremental refresh (i.e., synchronization (610)), the DPM may need to set up MQTs at the backend database for the purpose of MQT maintenance.

System parameters such as CPU ratio, I/O ratio, and network latency are specified separately for each backend databases. For this system configuration, the same methodologies are applied as for MQTA and DPA as described above for each backend database and each backend database has its own rank list of MQTs sorted by ROI. The DPA selects the MQT or VCU with the highest ROI among all rank lists and revise ROI in the rank list where MQTs or VCU is selected. The process continues until the user specified disk space limitations at the frontend database and/or the backend databases are reached. With the DPA methodology provided by the embodiments herein, the DPA may recommend more MQTs for a specific backend database than others.

Cloudscape™ V10.0, available from International Business Machines, NY, USA, is a pure, open source-based Java™ relational database management system that can be embedded in Java™ programs and used for online transaction processing (OLTP). A platform-independent, small-footprint (for example, 2MB) database, Cloudscape™ V10.0 integrates tightly with any Java™-based solution. Cloudscape™ works with application servers to provide database query result caching to improve database query response time. The methodology presented in FIG. 2 and the architecture in FIG. 3 can be applied to recommend query results to be cached at application servers as shown in FIG. 7. The sequence shown in FIG. 7 is the same as described in FIG. 5, except the frontend is an application sever instead of a database. MQTs may be stored in the memory of application server or as Java™ objects in a Java™ container. In step (710), synchronization between the backend database and frontend application server can be optional since most application servers have so called "write ahead/write through" capability. The update usually occurs in the application server first and then the updates are pushed from the application server to the backend database.

Therefore, the query workload is submitted to the DB2/II in step (701). Then, the queries are recorded in the log. The queries may be answered using MQTs or partially answered using MQTs and some queries (or queries fragments, which cannot be answered using MQTs) are forwarded to the backend database (702). The results are returned to the DB2/II and then returned to the user(s). Next, a read only query log (703) and write only query log (705) are loaded into MQTA along with simulated catalog (i.e., database statistics) (704). The MQTA then generates (706) MQT & query mapping, MQT size, (MQT, benefit, overhead), and MQT dependency. The DPA, then performs (707) additional tasks such as: synchronization cost estimation and what if analysis for data placement. Then, the DPA outputs (708) MQTs to the DPM. The MQTs generated by the DPA can be different from the MQTA recommended. Next, the DPM sets up MQTs at the II and sets up MQT synchronization in step (709). To support full refresh of MQTs at II, the DPM does not set up MQTs at the backend database.

In this application, the MQTs are corresponding to cached query results. In the case that application server tier caches do not support immediate refresh of cached query results (i.e. MQTs) but time to live (TTL) based invalidation, the synchronization can be ignored or set as a "delay refresh" mode in which MQTs are refreshed periodically instead of immediately.

Figure 8:
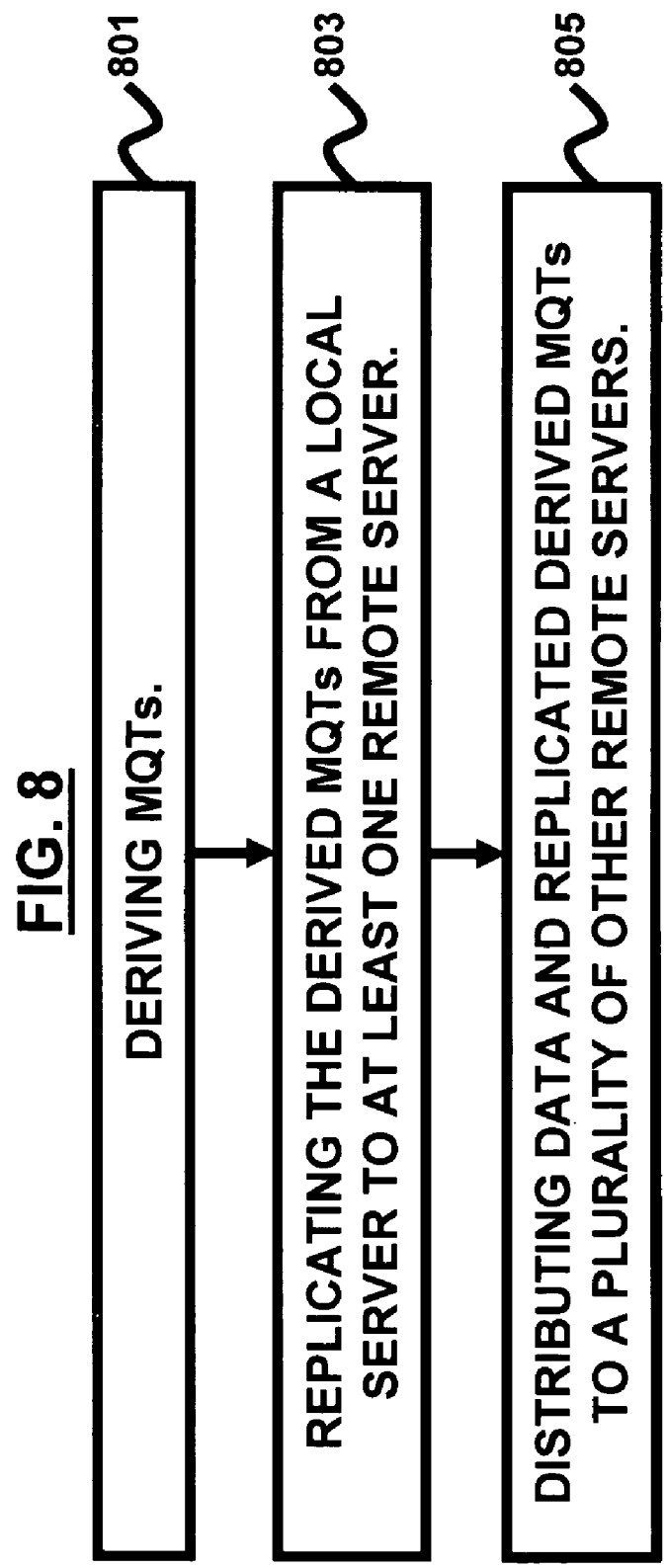
FIG. 8 is a flow diagram illustrating a preferred method according to an embodiment herein.

FIG. 8 is a flow diagram illustrating a method of evaluating queries in distributed databases with MQTS, according to an embodiment herein, wherein the method comprises deriving (801) MQTS; replicating (803) the derived MQTs from a local server to at least one remote server; and distributing (805) data and replicated derived MQTs to a plurality of other remote servers, wherein the distributing increases overall query execution efficiency. The databases may comprise heterogeneous databases. Preferably, the query execution efficiency comprises observed response time at a frontend database and associated costs comprising computational central processing unit costs, input/output costs, and network communication costs. Preferably, all of the associated costs comprise statistically estimated costs.

The method may further comprise running a MQT advisor at a frontend database, and considering the costs of at least one MQT placed at the frontend database. Moreover, the method may further comprise running a MQT advisor at a non-frontend database. Additionally, the increased overall query execution efficiency may consider all dependencies of all involved database instances and associated costs. Furthermore, the deriving of the MQTs preferably occurs using a data placement advisor database management system.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
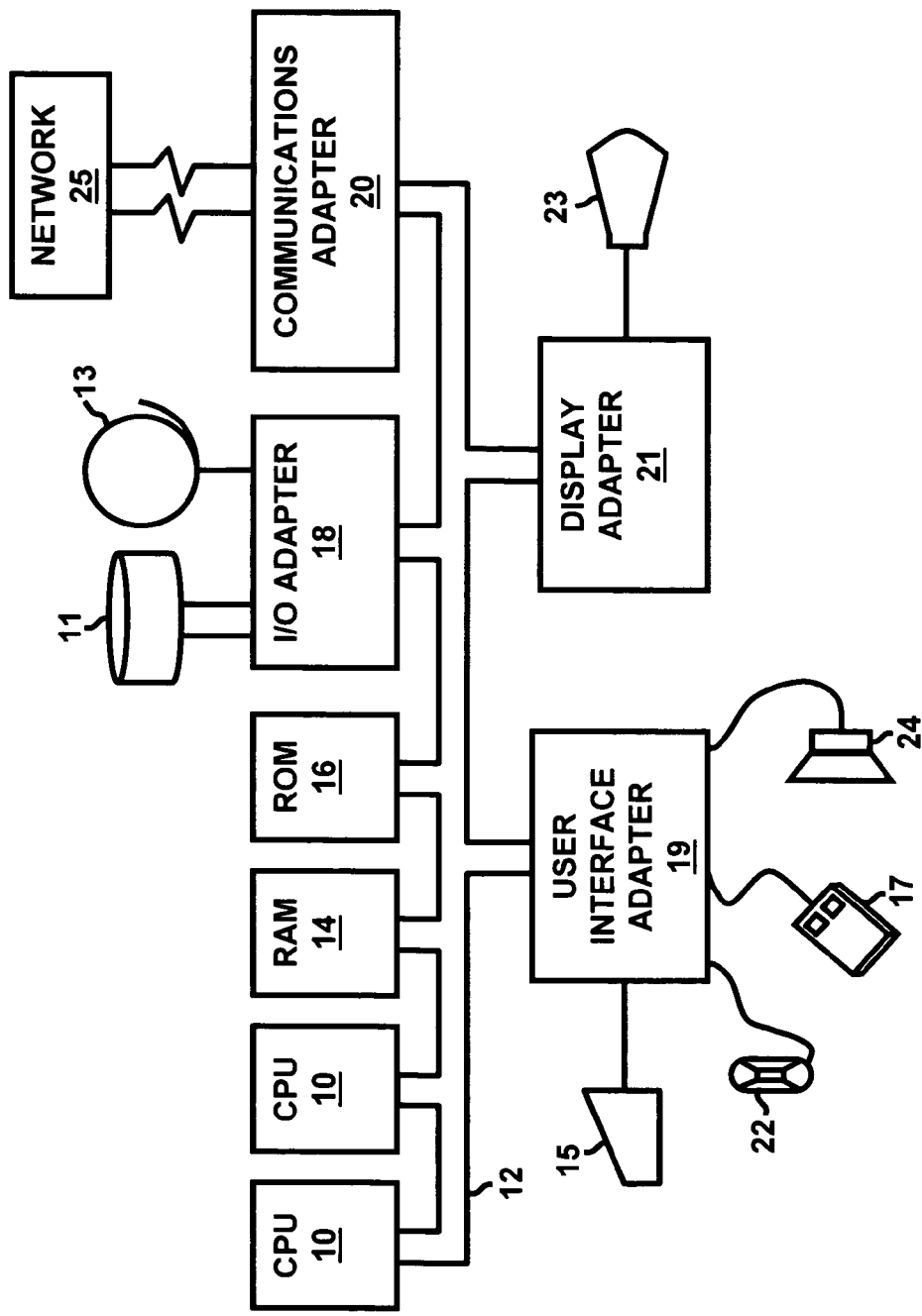
FIG. 9 illustrates a computer system diagram according to an embodiment herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

As mentioned, the main function of a MQTA is to recommend materialized query tables and indexes to improve response time of query process for a workload. The embodiments extend its functionality of MQTA by deriving MQT dependency and apply MQTA to distributed environments. The DPA takes the analytic results from the MQTA and performs additional frontend MQT synchronization cost analysis and what-if data placement so that traffic can be offloaded from the backend databases for better overall response time.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-implemented method of placing materialized query tables (MQTs) in a distributed database system for improving load distribution and reducing network latency, said method comprising:

inputting, by a user, to a materialized query table advisor (MQTA) of said distributed databases system,
  data placement destinations for MQTs in a frontend database and backend databases,
  a workload comprising a database update log and a read workload, and
  a simulated catalog of backend databases;
deriving, by said MQTA, candidate MQTs based on common parts of query statements;
calculating, by said MQTA, a total benefit for each instance of said candidate MQTs of all read queries of said workload in terms of resource time by comparing an estimated query processing time with and without said candidate MQTs, and a total overhead for refreshing said each candidate MQT for all write queries in said database update log in terms of said resource time;

deriving, by said MQTA, dependencies among said candidate MQTs, wherein a dependency indicates how multiple candidate MQTs are co-used in a single query statement;

deriving, by said MQTA, a total benefit for each dependency in terms of said resource time;

outputting, by said MQTA, to a data placement advisor (DPA), a query statement, an MQT identification, and a total benefit, corresponding to said workload;

inputting, by said user, to said DPA, database sizes allocated for said candidate MQTs in said frontend database and said backend databases, wherein a user specifies a space limit of said database sizes for any of said distributed database system, said frontend database, and said backend databases;

measuring, by said DPA, a synchronization cost for each of said candidate MQTs at said frontend database and said backend database, in terms of said resource time at said frontend to determine a total synchronization cost;

performing, by said DPA, a what-if data placement analysis comprising:

creating a ranked list of said candidate MQTs, based on return on investment (ROI), wherein said ROI is determined by dividing a net benefit, equal to said total benefit minus said total overhead minus said total synchronization cost, of each of said candidate MQTs by each of said candidate MOT's size;

for each said dependency, creating a virtual caching unit (VCU), determining said ROI for each said VCU, and inserting said VCU in said ranked list; and selecting from said ranked list said candidate MQT or VCU having a highest ROI and fitting said space limit, removing said selected MQT or VCU from said ranked list, and inserting said selected MQT or VCU into a recommended MQT list; and re-calculating ROIs of said ranked list, based on subsumption of a candidate MQT by a VCU, and selecting from said ranked list said candidate MQT or VCU having a highest ROI and fitting said space limit, and inserting said selected MQT or VCU into said recommended MQT list, until said space limit is exceeded; and using, by a data placement manager, said recommended MQT list, to reduce network latency in said distributed database system, by creating MQTs at said backend databases from said recommended MQT list; creating frontend MQTs, based on created backend MQTs; and synchronizing said created frontend MQTs with said created backend MQTs.

2. The method of claim 1, wherein said frontend and said backend comprise heterogeneous databases.

3. The method of claim 1, wherein a query execution efficiency comprises observed response time at said frontend and associated costs comprising computational central processing unit costs, input/output costs, and network communication costs.

4. The method of claim 3, wherein said associated costs comprise statistically estimated costs.

5. The method of claim 4, further comprising running a MQT advisor at a frontend database, and considering said associated costs of at least one MQT placed at said frontend database.

6. The method of claim 4, further comprising running said MQTA at a non-frontend database.

7. The method of claim 3, wherein the query execution efficiency considers all dependencies of all involved database instances and associated costs.

8. A computer program storage medium readable by computer, tangibly embodying a program of instructions executable by said computer to perform a method of placing materialized query tables (MQTs) in a distributed database system by improving load distribution and reducing network latency, said method comprising:

inputting data placement destinations for MQTs in a frontend database and backend databases, a workload comprising a database update log and a read workload, and a simulated catalog of backend databases;

deriving candidate MQTs based on common parts of query statements;

calculating a total benefit for each instance of said candidate MQTs of all read queries of said workload in terms of resource time by comparing an estimated query processing time with and without said candidate MQTs, and a total overhead for refreshing said each candidate MQT for all write queries in said database update log in terms of said resource time;

deriving dependencies among said candidate MQTs, wherein a dependency indicates how multiple candidate MQTs are co-used in a single query statement;

deriving a total benefit for each dependency in terms of said resource time;

outputting a query statement, an MQT identification, and a total benefit, corresponding to said workload;

inputting database sizes allocated for said candidate MQTs in said frontend database and said backend databases, wherein a user specifies a space limit of said database sizes for any of said distributed database system, said frontend database, and said backend databases;

measuring a synchronization cost for each of said candidate MQTs at said frontend database and said backend database, in terms of said resource time at said frontend to determine a total synchronization cost;

performing a what-if data placement analysis comprising:

creating a ranked list of said candidate MQTs, based on return on investment (ROI), wherein said ROI is determined by dividing a net benefit, equal to said total benefit minus said total overhead minus said total synchronization cost, of each of said candidate MQTs by each of said candidate MQT's size;

for each said dependency, creating a virtual caching unit (VCU), determining said ROI for each said VCU, and inserting said VCU in said ranked list; and selecting from said ranked list said candidate MQT or VCU having a highest ROI and fitting said space limit, removing said selected MQT or VCU from said ranked list, and inserting said selected MQT or VCU into a recommended MQT list; and re-calculating ROIs of said ranked list, based on subsumption of a candidate MQT by a VCU, and selecting from said ranked list said candidate MQT or VCU having a highest ROI and fitting said space limit, and inserting said selected MQT or VCU into said recommended MQT list, until said space limit is exceeded; and using said recommended MQT list, to reduce network latency in said distributed database system, by creating MQTs at said backend databases from said recommended MQT list; creating frontend MQTs, based on created backend MQTs; and synchronizing said created frontend MQTs with said created backend MQTs.

9. The computer program storage medium of claim 8, wherein said frontend and said backend comprise heterogeneous databases.

10. The computer program storage medium of claim 8, wherein a query execution efficiency comprises observed response time at said frontend and associated costs comprising computational central processing unit costs, input/output costs, and network communication costs.

11. The computer program storage medium of claim 10, wherein said associated costs comprise statistically estimated costs.

12. The computer program storage medium of claim 11, wherein said method further comprises running a MQT advisor at a frontend database, and considering said associated costs of at least one MQT placed at said frontend database.

13. The computer program storage medium of claim 11, wherein said method further comprises running said MQTA at a non-frontend database.

14. The computer program storage medium of claim 10, wherein the query execution efficiency considers all dependencies of all involved database instances and associated costs.

15. A distributed database system for placing materialized query tables (MQTs) in said distributed database system by improving load distribution and reducing network latency, said distributed database system comprising:
  a memory, connected to a materialized query table advisor (MQTA) of said distributed databases system, to which a user inputs:
  data placement destinations for MQTs in a frontend database and backend databases,
  a workload comprising a database update log and a read workload, and
  a simulated catalog of backend databases; and
  a processor configured to:
    derive, by said MQTA, candidate MQTs based on common parts of query statements;
    calculate, by said MQTA, a total benefit for each instance of said candidate MQTs of all read queries of said workload in terms of resource time by comparing an estimated query processing time with and without said candidate MQTs, and a total overhead for refreshing said each candidate MQT for all write queries in said database update log in terms of said resource time;
    derive, by said MQTA, dependencies among said candidate MQTs, wherein a dependency indicates how multiple candidate MQTs are co-used in a single query statement;
    derive, by said MQTA, a total benefit for each dependency in terms of said resource time;
    output, by said MQTA, to a data placement advisor (DPA), a query statement, an MQT identification, and a total benefit, corresponding to said workload;
    input, by said use to said DPA, database sizes allocated for said candidate MQTs in said frontend database and said backend databases,
    wherein a user specifies a space limit of said database sizes for any of said distributed database system, said frontend database, and said backend databases;
    measure, by said DPA, a synchronization cost for each of said candidate MQTs at said frontend database and said backend database, in terms of said resource time at said frontend to determine a total synchronization cost;
    perform, by said DPA, a what-if data placement analysis comprising:
      creating a ranked list of said candidate MQTs, based on return on investment (ROJ), wherein said ROI is determined by dividing a net benefit, equal to said total benefit minus said total overhead minus said total synchronization cost, of each of said candidate MQTs by each of said candidate MQT's size;
      for each said dependency, creating a virtual caching unit (VCU), determining said ROI for each said VCU, and inserting said VCU in said ranked list; and
      selecting from said ranked list said candidate MQT or VCU having a highest ROI and fitting said space limit, removing said selected MQT or VCU from said ranked list, and inserting said selected MQT or VCU into a recommended MQT list; and
      re-calculating ROIs of said ranked list, based on subsumption of a candidate MQT by a VCU, and selecting from said ranked list said candidate MQT or VCU having a highest ROI and fitting said space limit, and inserting said selected MQT or VCU into said recommended MQT list, until said space limit is exceeded; and
  use, by a data placement manager, said recommended MQT list, to reduce network latency in said distributed database system, by creating MQTs at said backend databases from said recommended MQT list; creating frontend MQTs, based on created backend MQTs; and synchronizing said created frontend MQTs with said created backend MQTs.

16. The system of claim 15, wherein said frontend and said backend comprise heterogeneous database.

17. The system of claim 15, wherein a query execution efficiency comprises observed response time at said frontend and associated costs comprising computational central processing unit costs, input/output costs, and network communication costs.

18. The system of claim 17, wherein said associated costs comprise statistically estimated costs.

19. The system of claim 18, further comprising means for running a MQT advisor at a frontend database, and considering said associated costs of at least one MQT placed at said frontend database.

20. The system of claim 18, further comprising means wherein said method further comprises running said MQTA at a non-frontend database.

21. The system of claim 17, wherein the query execution efficiency considers all dependencies of all involved database instances and associated costs.

* * * * *